Oct. 22, 1968   B. LACEY   3,406,774
AUTOMOBILE ELECTRICAL SYSTEM CIRCUITRY
Filed Aug. 14, 1967   2 Sheets-Sheet 2
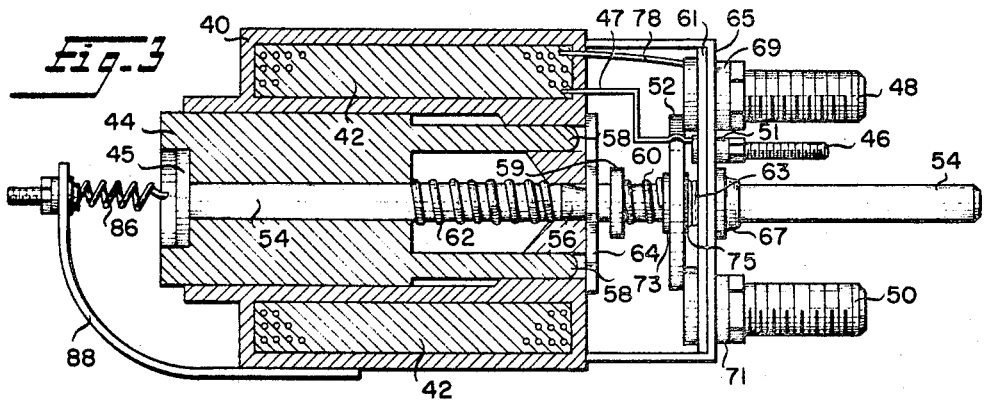
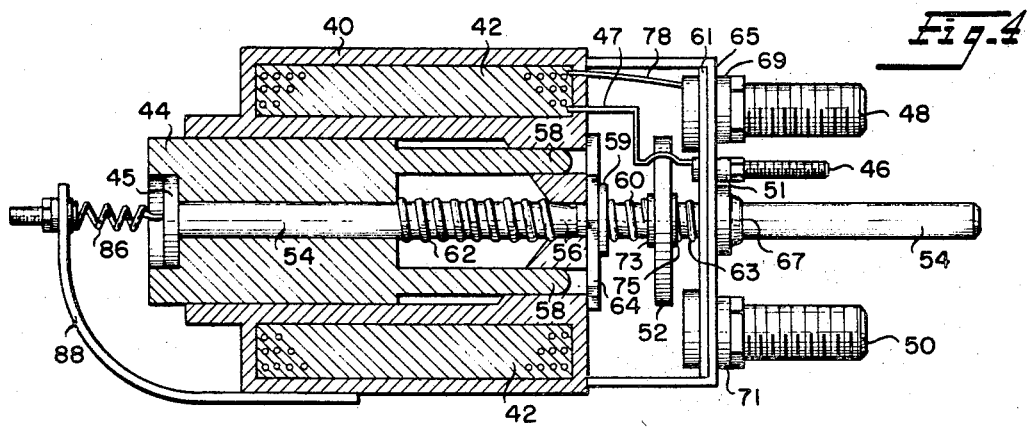
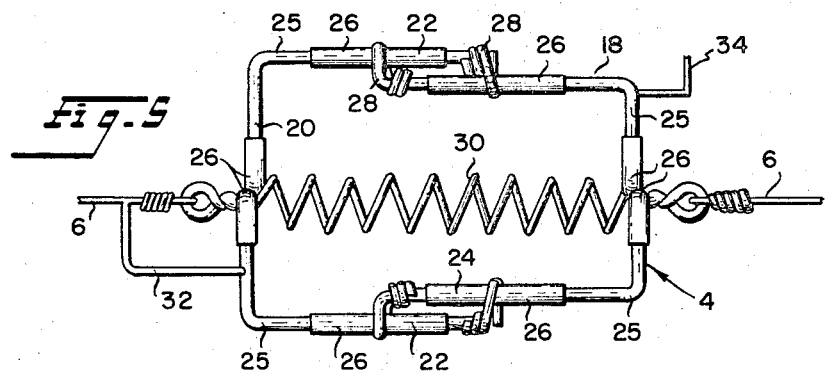
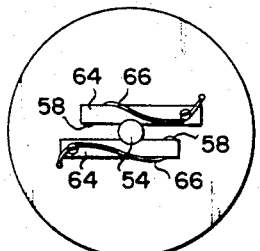
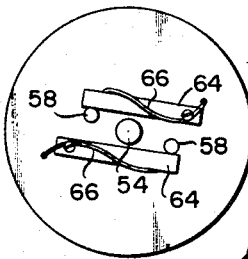
INVENTOR
Byron Lacey
Dennison & Dennison
ATTORNEYS United States Patent Office 3,406,774
Patented Oct. 22, 1968

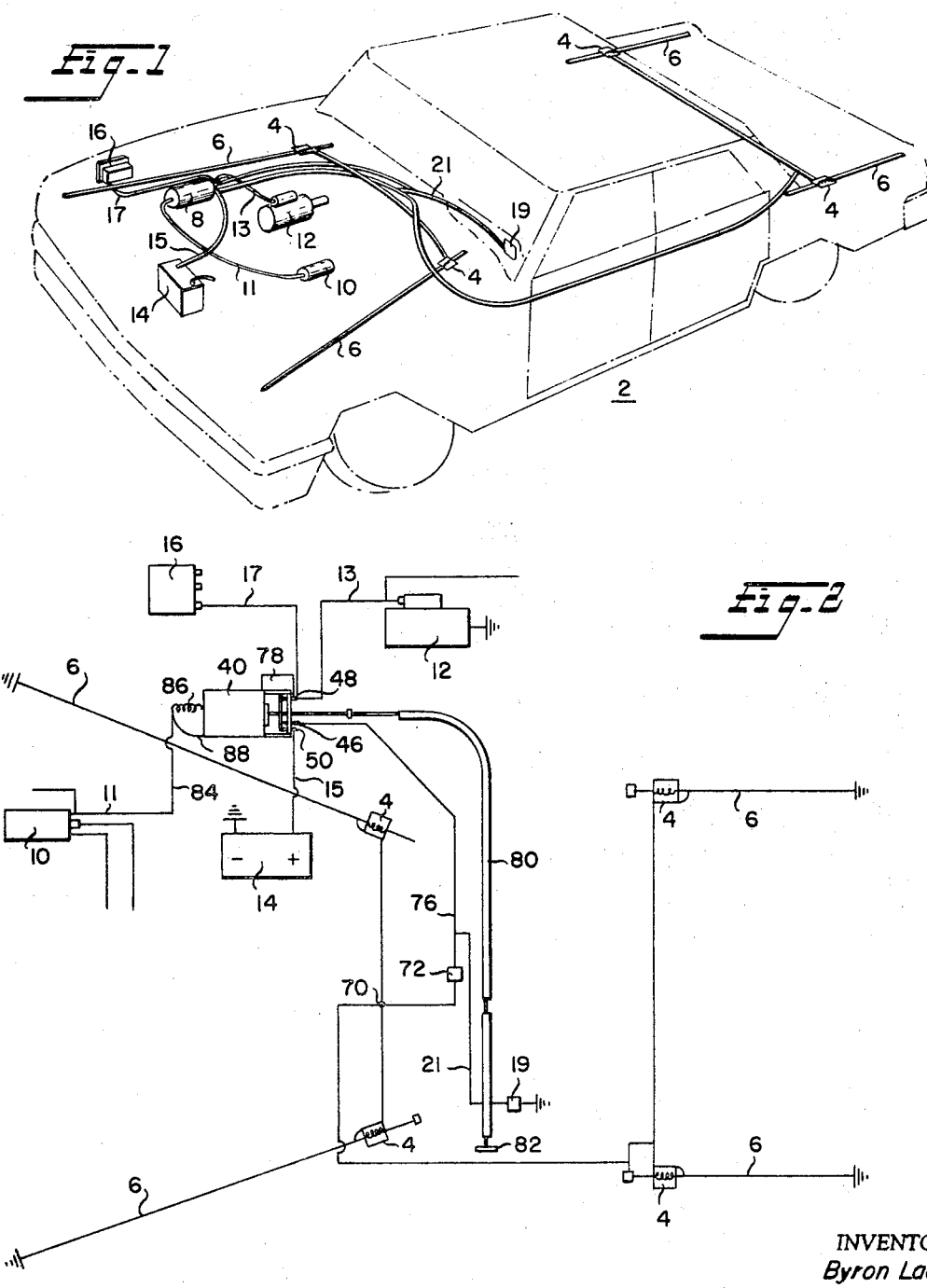

3,406,774
AUTOMOBILE ELECTRICAL SYSTEM CIRCUITRY
Byron Lacey, Drumright, Okla., assignor of
one-half to Charles E. Daniel
Filed Aug. 14, 1967, Ser. No. 660,279
8 Claims. (Cl. 180—96)

ABSTRACT OF THE DISCLOSURE

A solenoid device for use in automobiles to disconnect the battery from the remainder of the electrical circuitry upon collision of the automobile, the solenoid being actuated by one of a number of tension spring shorting switches.

Background and objects of the invention

The invention relates to automobile safety devices, and specifically to a means for disconnecting the electrical power from the electrically operated components of an antomobile in the event that the automobile is involved in a collision. This will prevent fires caused by electrical short-circuits which may occur as a result of such a collision. In addition, the operator, may, by the push of a button disconnect the electrical power thus preventing possible fires caused by a short-circuit while the car is in storage.

In the past, devices have been utilized to render automobiles inoperative upon collision, such as the patent to Austin, No. 1,682,731. Another attempt to disable a vehicle is shown in Patent No. 3,261,423, which shows a device for breaking off the battery terminal. In addition, Patent No. 1,653,945 shows a device for cutting-off the fuel supply to an automobile. These patents however do not contain all of the desirable features of the present invention.

It is therefore an object of the present invention to provide a circuit breaker for automatically disconnecting the electrical power from an automobile in the event of an accident.

It is another object of the invention to provide such a circuit breaker to be manually operable by the driver, for use when the automobile is in storage.

A further object of the invention is to provide a circuit breaker which is actuated upon collision or by the smashing of any of the fenders of an automobile.

Still another object of the invention is to provide a foolproof electro-mechanical device for disabling an automobile electrical circuit upon collision.

Summary of the invention

In a preferred embodiment of the invention there are provided four steel cables, one on each fender of the automobile and grounded to the frame thereof. As a portion of the cable, and held in tension thereby, are four spring loaded switches which are held in an open position by the tension on the steel cables. Upon collision, the fender is smashed toward the body of the automobile and the spring switch is closed thereby shunting to ground one terminal of a solenoid device. The solenoid device in its closed position provides a path between the automobile battery and the remainder of the electrical components. Upon grounding of the solenoid terminal the solenoid plunger is actuated thus opening the circuit between the battery and the remainder of the electrical equipment. In addition, a pushbutton switch is provided for operation by the operator of the automobile to manually disconnect the battery from the remainder of the electrical equipment at any desired time.

Brief description of the drawings

The above features and objects of the invention will be better understood if taken in conjunction with the drawings in which:

FIGURE 1 is a perspective view of an automobile showing the placement of the steel cables, spring loaded switches, and the electrical system of the automobile.

FIGURE 2 is a diagram, partly in schematic, of the overall system of the invention.

FIGURE 3 is a cross-sectional view of the solenoid circuit breaker of the invention in its closed position.

FIGURE 4 is a cross-sectional view of the solenoid in its open position.

FIGURE 5 is a view of one of the spring loaded switches, here shown in its open position.

FIGURE 6a is a view of the spring loaded catches forming a part of the circuit breaker in the closed position.

FIGURE 6b is a view of the spring loaded catches in their open position.

Detailed description of the invention generally

In FIGURE 1, an automobile is shown generally at 2. Preferably under the hood and in the trunk are mounted a plurality of spring loaded switches 4 which are held under tension and in an open position by steel cables 6.

Also shown are the circuit breaker 8 of the present invention along with the components of the automobile electrical system including the coil 10, starter 12, battery 14 and voltage regulator 16. The various interconnecting wires are also shown, line 11 connecting the coil to the circuit breaker, line 13 connecting the starter to the circuit breaker, line 15 connecting the battery to the circuit breaker and line 17 connecting the voltage regulator to the circuit breaker. Also shown is a pushbutton switch 19 and its connection 21 to the circuit breaker.

Spring switch and operation thereof

FIGURE 5 shows a detailed drawing of one of the tension switches. The switch is composed generally of two sections 18 and 20 with overlapping portions 22 and 24. The body of the switch is made of copper wire 25 or a like material, with insulation shown at 26. The two sections of the switches 18 and 20 are held in cooperative arrangement by loops 28 in the ends of the copper wire. The steel cables 6 are shown holding the spring under tension and in the position as shown in FIGURE 5. A spring 30 is provided which tends to draw the switch closed if tension is released on the steel cable 6. When the switch is drawn closed, the bare loops of the copper wire will contact the bare portion of the copper wire thus closing a circuit. The left side of the switch 20 is connected by wire 32 directly to the steel cable 6, and therefore this side of the switch will be grounded. A wire 34 is provided to be connected with a solenoid circuit breaker as will be discussed later.

Solenoid switch

FIGURE 3 shows a solenoid circuit breaker in its closed position. The solenoid consists essentially of an outer shell or casing 40, a solenoid winding 42, an inner core section 44, and terminal 46, the solenoid ground terminal. Provided also are terminals 48 and 50 whose function will be explained later. Inside the solenoid is a copper, or like metal, washer indicated at 52. In the closed position of the solenoid, washer 52 contacts the inside portions of terminals 48 and 50 thus completing a circuit therethrough.

FIGURE 4 shows the same solenoid circuit breaker unit in its open position, and like parts are numbered as in FIGURE 3. It can be seen, that in this position, washer 52 is drawn away from terminals 48 and 50, thereby opening the circuit between these two terminals.

Also provided in the circuit breaker structure are an actuating rod 54 extending essentially the full length of the solenoid circuit breaker. At one point 56 the actuating rod 54 is reduced in diameter to form a locking catch the function and operation of which will be discussed below. The actuating rod 54 is not a part of the inner core section 44, but extends through the hollow bore in the center of the core section. Flange 45 on actuating rod 54 contacts core 44.

On the forward end (or the right side, as the drawing is viewed) of the inner core section 44 are provided two beveled points 58 whose function will also be later explained.

Additionally, springs 60, 62 and 63 are provided, again their functions to be explained in conjunction with a discussion of the operation of the overall system.

Referring now to FIGURES 6a and 6b, there is shown a pair of spring loaded catches 64. These catches may also be seen, but in side view, in FIGURES 3 and 4. The catches are biased toward actuating rod 54 by springs 66. In FIGURE 6a the catches 64 are shown engaging the actuating rod 54 at the aforementioned reduced area 56. FIGURE 6b shows the catches in their released or open position. The catches in FIGURE 6b have been forced open by the action of beveled points 58 attached to the inner core 44 of the solenoid.

*Operation of the system*

Referring to FIGURE 2 of the drawings, the operation of the overall system will be discussed with reference to the additional circuitry connecting the conventional elements of the automobile's electrical system. Four spring loaded switches 4 are shown which are attached to the inside portion of the automobile fenders. Also shown are the steel cables 6 which as earlier noted are used to hold the spring loaded switches under tension. It will be noted that one side of each switch is connected to a ground terminal of the automobile sheet metal, and the other side of the switches are connected to a common junction point 70. A plug terminal 72 is provided, which function will be later explained. In addition to the spring loaded switches, a push-button switch 19 is provided for manual operation of the system from the automobile dashboard. All of the switches above noted are connected through common line 76 to the terminal 46 of the solenoid.

The positive side of automobile battery 14 is connected to a terminal 50 of the solenoid and the remainder of the automobile electrical system is connected to terminal 48 of the solenoid. In addition, one side of the solenoid coil 42 through line 78 is connected to terminal 48 of the solenoid. The voltage regulator 16, the starter 12, and all other electrical equipment are, as noted connected to the same terminal 48 of the solenoid. A connection from terminal 46 to the other side of the solenoid coil is an internal connection and is shown as 47 in FIGURES 3 and 4.

*Structure and operation of the solenoid circuit breaker*

Bracket 65 is a mounting bracket upon which terminals 46, 48 and 50 are mounted. The bracket 65 is rigidly attached to the body 40 of the solenoid circuit breaker. Spacer 51 is an insulating spacer to prevent connections on terminal 46 from contacting bracket 65, thereby avoiding the shorting of terminal 46 to ground.

In addition, 61 is an insulating spacer which prevents terminals 46, 48 and 50 from being shorted, to each other or to ground, through bracket 65. A portion of spacer 61 extends partially through bracket 65 to maintain a spacing between terminals 46, 48 and 50 and bracket 65.

Also provided are insulating spacers 73 and 75, 73 extending through washer 52, to insulate washer 52 from rod 54. 69 and 71 are two additional insulating spacers preventing connection on terminals 48 and 50 from contacting bracket 65.

In operation, the solenoid circuit breaker device is set into its operating position through actuating cable 80 as shown in FIGURE 2, and which is connected to a convenient position, for example, under the dashboard of the automobile where it may be operated by pulling handle 82. When the actuating cable 80 is pulled, the actuating rod 54 of the solenoid is, of course pulled out. When the rod 54 is pulled out, flange 45 also causes core 44 to be pulled somewhat to the right. The washer 52 then makes contact with terminals 48 and 50 of the solenoid and completes a circuit therethrough connecting the battery to the remainder of the electrical components of the automobile. The actuating rod 54 is held in this position through the use of the spring loaded catches as shown in FIGURES 6a and 6b. As the actuating rod 54 is pulled out, the catches 64 will engage the reduced portion 56 of the rod 54, thus maintaining the rod in its "cocked" position, against the bias of spring 62. The rod, being held by the catches 64, maintains the shorting washer 52 against terminals 48 and 50 of the circuit breaker.

As earlier mentioned, spring 62 provides a bias tending to push actuating rod 54 to the left (as shown in FIGURES 3 and 4). Spring 63 provides a bias tending to force washer 52 away from terminals 48 and 50. Ring 67 is a ring slidably mounted on rod 54 against which spring 63 acts. Ring 67 is held against movement to the right by bracket 65. Spring 60 mounted between a ring 59, which is rigidly attached to rod 54, and insulating spacer 73. This spring tends to force washer 52 against terminals 48 and 50 to maintain a good electrical contact therebetween.

In the event of an accident wherein the fenders are pushed in toward the body of the automobile the tension on one of the steel cables 6 will be released thus allowing the tension spring 30 of the spring loaded switch to draw the two switch sections together. The bare copper wire loop 28 in the end of one side of the switch will then contact a bare portion of the copper wire 25 on the other portion of the switch, thereby completing a circuit through the switch. The completion of this circuit to ground, will ground terminal 46 of the solenoid. The grounding of terminal 46 of the solenoid through line 76, switch 4 and cable 6 completes a circuit through the positive side of the battery, through terminal 50, through the washer 52, through terminal 48 of the solenoid and through wire 78 to the coil 42 of the solenoid, and returning to ground. This will cause the core 44 of the solenoid to be pulled in, forcing beveled members 58 to the right, as seen in FIGURE 3, thus tripping the two spring loaded catches 64, allowing the washer 52 to be forced away from terminals 48 and 50 by springs 62 and 63. Of course, when washer 52 is forced away from terminals 48 and 50, power will be disconnected from the solenoid coil 42, allowing core 44 to be forced to the left by spring 62.

As can be seen, this will disconnect all power from the battery to the remainder of the automobile electrical system, with the exception of the generator while the car is running. The generator power is cut-off when the motor stops. This is accomplished by a wire 84 running from the ignition coil 10 to the back of the circuit breaker. The coil is shorted out when rod 54 is pushed to the back of the circuit breaker by spring 62. The spring 86 completes a circuit between the rod and a spring clip 88 which is connected to a ground. This action will kill the motor. It should be noted, that on automobiles with alternators rather than generators, this ground would not be needed.

The pushbutton switch 74 is provided for the convenience of the operator, in the event he wishes to manually disconnect the automobile electrical system, for example, during periods of storage. The operation is the same as set forth above, the switch 74 merely providing a path to ground in a manner similar to that provided by switches 20.

The block 72 is provided as a convenient jumper terminal to render the device of the invention inoperative. Normally a shorting plug would be used while the system is in operation, but removal of the plug will break the ground connection, and by pulling handle 82 to reset the system, the operator can provide power to operate the automobile in the event, for example, of only minor fender damage which is however enough to operate the system.

In addition, although the device here has been discussed with reference to a negative ground system, the device will work equally as well with a positive ground electrical system.

While the invention has been described, it will be understood that it is capable of further modification and this application is intended to cover any variations, uses, or adaptations of the invention following in general the principles of the invention, and including such departure from the present discolsure as come within the knowledge or customary practice in the art to which the invention pertains, and as may be applied to the essential features hereinbefore set forth and as fall within the scope of the invention or the limits of the appended claims.

What is claimed is:

1. A spring loaded switch comprising:
   (a) two substantially U-shaped members,
   (b) one of said U-shaped members being somewhat smaller in width than the other of said U-shaped members,
   (c) loops formed in each of the two ends of each of said U-shaped members,
   (d) such that each of said loops of said smaller U-shaped member engages one of the legs of said larger U-shaped member,
   (e) and each of said loops of said larger U-shaped member engages one of the legs of said smaller U-shaped member, and
   (f) a spring connecting said two U-shaped members such as to bias said U-shaped members in a first position.

2. A spring loaded switch as set forth in claim 1 further comprising:
   (a) insulation on each of said legs of each of said U-shaped members,
   (b) means to maintain said U-shaped members under tension opposing the bias of said spring,
   (c) such that when the switch is held under tension, each of said loops is electrically insulated from the said leg with which it is mechanically cooperative.

3. A deactivation system for an electrical system comprising:
   (a) a plurality of tension switches located at desired points in the system,
   (b) a solenoid device having at least three terminals,
   (c) said switches being operatively connected to a first of said solenoid terminals,
   (d) a source of power connected to a second of said solenoid terminals,
   (e) a third of said solenoid terminals being connected to an electrically operated device,
   (f) a contact member in said solenoid device,
   (g) said contact member normally completing a circuit between said second and third terminals,
   (h) whereby actuation of any one of said plurality of switches breaks said circuit between said second and third terminals,
   (i) biasing means tending to force said contacting member away from said second and third terminals, and
   (j) catch means to maintain said contacting member in contact with said second and third terminals and against the bias of said biasing means.

4. A deactivation system as set forth in claim 3 for use in an automobile electrical system wherein:
   (a) said tension switches are adjacent each fender of said automobile,
   (b) said solenoid device further comprising:
      (1) a solenoid coil with first and second terminals
      (2) a core member disposed within said solenoid coil
   (c) said first coil terminal is connected to said second solenoid terminal, and
   (d) said second coil terminal is connected to said first solenoid terminal.

5. A deactivation system as set forth in claim 4 further comprising:
   (a) an actuating rod,
   (b) said core member having an axial, cylindrical opening extending therethrough,
   (c) said actuating rod extending through said axial, cylindrical opening in said core member.

6. A deactivation system as set forth in claim 5 wherein:
   (a) said contact member is carried by said actuating rod,
   (b) said tension switches held in an open position by cables under tension, and
   (c) said tension switches actuated by smashing one of said fenders inwardly of said automobile,
   (d) thereby releasing the tension on said cables and allowing said tension switches to close.

7. A solenoid device comprising:
   (a) a solenoid coil with first and second coil terminals,
   (b) a core member disposed within said solenoid coil,
   (c) said core member having an axial, cylindrical opening extending therethrough,
   (d) an actuating rod extending through said axial, cylindrical opening,
   (e) said actuating rod carrying a contacting member,
   (f) first and second additional terminals cooperating with said device,
   (g) means connecting said first coil terminal to said first additional terminal,
   (h) means connecting said second additional terminal to a source of power,
   (i) biasing means tending to force said contacting member away from said additional terminals, and
   (j) catch means to maintain said contacting member in contact with said two additional terminals and against the bias of said biasing means.

8. A solenoid device as set forth in claim 7 further comprising:
   (a) means for completing a circuit from said second coil terminal to ground,
   (b) whereby upon completing said circuit, said contacting member is forced away from said first and second additional terminals by said biasing means.

References Cited

UNITED STATES PATENTS

| | | | |
|---|---|---|---|
| 1,081,884 | 12/1913 | Bertagnolli | 200—161 |
| 1,418,678 | 6/1922 | Schauman | 180—96 |
| 1,689,075 | 10/1928 | Lehman | 335—192 |
| 1,927,444 | 9/1933 | Overbury | 180—96 |
| 2,213,158 | 8/1940 | Buxton | 335—187 |
| 2,304,608 | 12/1942 | Smythe. | |
| 2,481,176 | 9/1949 | Taylor et al. | |
| 2,671,836 | 3/1954 | Anger et al. | 335—192 |
| 3,242,283 | 3/1966 | Clements | 335—192 X |

KENNETH H. BETTS, *Primary Examiner.*